(12) United States Patent
Jung et al.

(10) Patent No.: US 9,910,831 B2
(45) Date of Patent: Mar. 6, 2018

(54) DISPLAY APPARATUS AND METHOD FOR PROVIDING FONT EFFECT THEREOF

(71) Applicant: SAMSUNG ELECTRONICS CO., LTD., Suwon-si (KR)

(72) Inventors: Kyu-hun Jung, Suwon-si (KR); Bong-je Cho, Hwaseong-si (KR); Sang-Beom Cho, Suwon-si (KR); Han-sol Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 19 days.

(21) Appl. No.: 14/487,708

(22) Filed: Sep. 16, 2014

(65) Prior Publication Data

US 2015/0091934 A1  Apr. 2, 2015

(30) Foreign Application Priority Data

Sep. 27, 2013  (KR) ........................ 10-2013-0115549

(51) Int. Cl.
*G06F 17/21* (2006.01)
*G09G 5/28* (2006.01)
*G06T 11/00* (2006.01)
*G06T 11/60* (2006.01)

(52) U.S. Cl.
CPC .......... *G06F 17/214* (2013.01); *G06T 11/001* (2013.01); *G06T 11/60* (2013.01); *G09G 5/28* (2013.01); *G06F 17/21* (2013.01); *G06T 2200/24* (2013.01); *G09G 2340/0407* (2013.01); *G09G 2340/0414* (2013.01); *G09G 2340/0421* (2013.01); *G09G 2340/10* (2013.01)

(58) Field of Classification Search
None
See application file for complete search history.

(56) References Cited

U.S. PATENT DOCUMENTS

| | | |
|---|---|---|
| 6,115,498 A | 9/2000 | Ro et al. |
| 6,867,787 B1 | 3/2005 | Shimizu et al. |
| 2006/0066619 A1 | 3/2006 | Duggan et al. |
| 2007/0139412 A1 | 6/2007 | Stamm et al. |

(Continued)

FOREIGN PATENT DOCUMENTS

| | | |
|---|---|---|
| EP | 1 033 697 A1 | 9/2000 |
| JP | 2006-106729 A | 4/2006 |
| JP | 2008-020504 A | 1/2008 |

OTHER PUBLICATIONS

WebPlus, "Using 2D filter effects", Jan. 17, 2013.*

(Continued)

*Primary Examiner* — Mark Zimmerman
*Assistant Examiner* — Yu-Jang Tswei
(74) *Attorney, Agent, or Firm* — Sughrue Mion, PLLC

(57) ABSTRACT

A display apparatus and a method for providing a font effect thereof are provided. The method includes obtaining character information and font information of a character; determining an attribute value of a font effect according to at least one of characteristics of the character and characteristics of the display apparatus; rendering the font effect based on the determined attribute value and applying the rendered font effect to the character; and outputting the character to which the font effect is applied.

24 Claims, 18 Drawing Sheets

(56) References Cited

U.S. PATENT DOCUMENTS

| | | | |
|---|---|---|---|
| 2007/0139415 A1* | 6/2007 | Stamm | G06T 3/40 345/472 |
| 2007/0198447 A1 | 8/2007 | Tilford et al. | |
| 2008/0303825 A1 | 12/2008 | Clegg et al. | |
| 2009/0153367 A1* | 6/2009 | Lee | G06F 3/03545 341/20 |
| 2011/0122140 A1 | 5/2011 | Kawasaki | |
| 2011/0224967 A1 | 9/2011 | Van Schaik | |
| 2013/0124658 A1 | 5/2013 | Fioretti et al. | |
| 2014/0111416 A1* | 4/2014 | Sugiura | G06F 3/04883 345/156 |

OTHER PUBLICATIONS

Mabinogi World Wiki, "Options Dialog", Mar. 12, 2013.*
Ant, Strider and Penguinboy, "The Whole Half-Life—Mapping Tutorials and Resources", Apr. 22, 2013.*
OSXDaily, "Zoom Web Browsers & Increase Font Size for Easier Reading on the Web", May 2013.*
TheArtOfWeb, CSS Animation Using CSS Transforms—Feb. 17, 2012.*
Anum, "Create a Shaded Stylize Text Effect in Photoshop", Aug. 28, 2013, SitePoint.*
Autodesk, "AliasStudio Help: Render", Dec. 24, 2010.*
Written Opinion, Issued by the International Searching Authority, Dated Dec. 17, 2014, In counterpart International Application No. PCT/KR2014/008958.
Search Report, Issued by the International Searching Authority, Dated Dec. 17, 2014, In counterpart International Application No. PCT/KR2014/008958.
Search Report, Issued by the European Patent Office, Dated Feb. 12, 2015, In counterpart European Application No. 14185796.1.
Communication dated Apr. 14, 2016 issued by the European Patent Office in counterpart European Patent Application No. 14 185 796.1.
Communication issued by the European Patent Office dated Dec. 22, 2017 in counterpart European Patent Application No. 14185796.1.

* cited by examiner

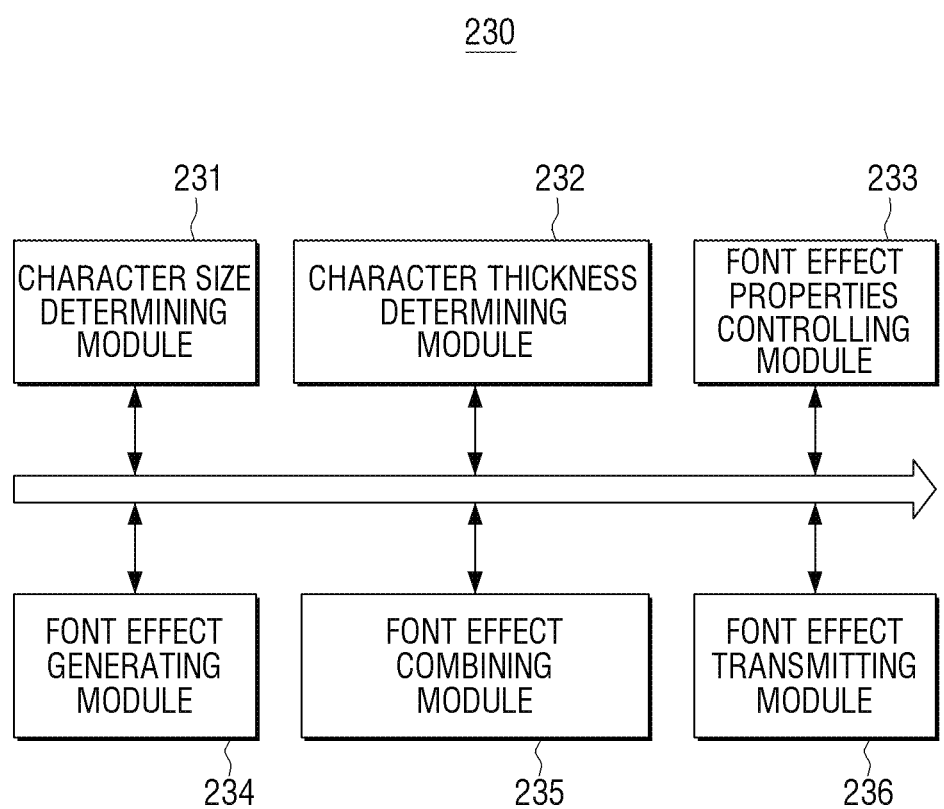

FIG. 6A
(RELATED ART)
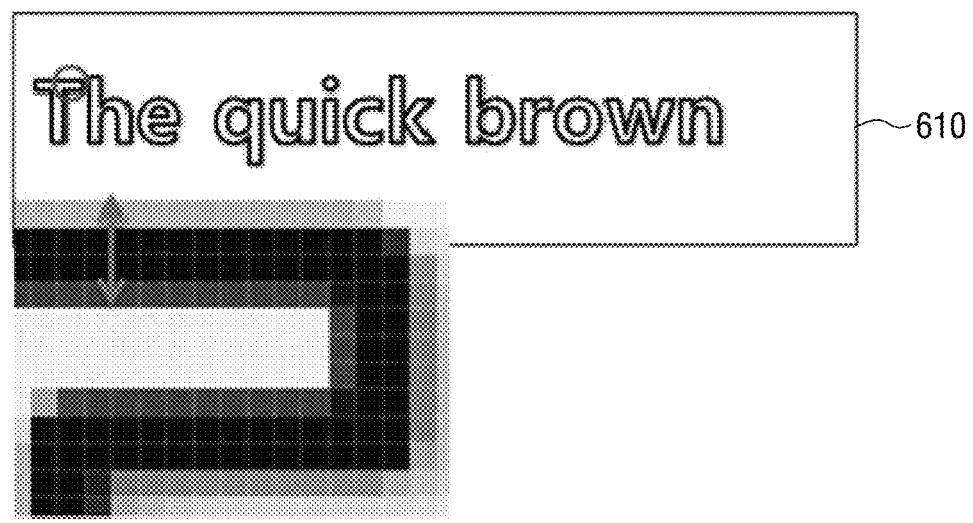
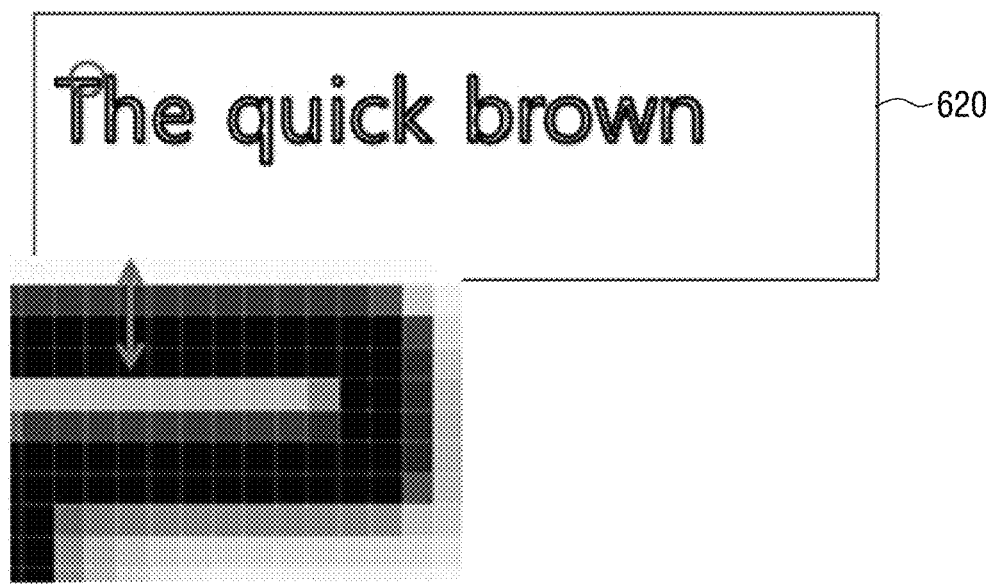

FIG. 7A
(RELATED ART)
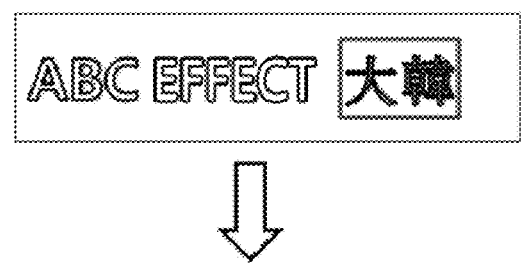
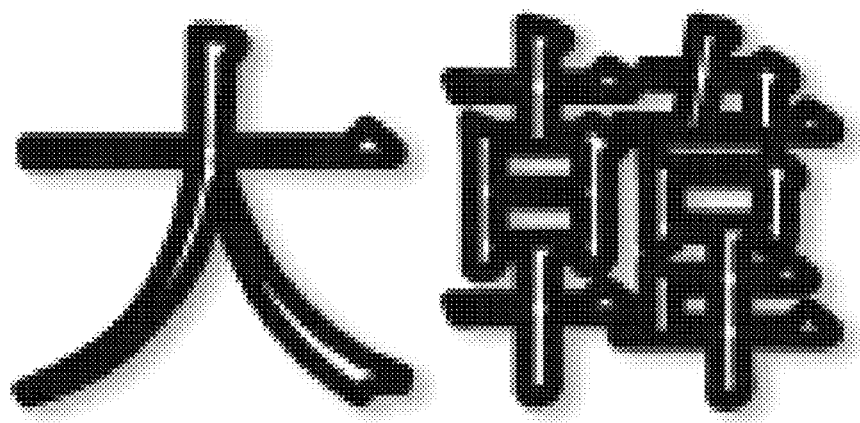

FIG. 9A
(RELATED ART)
HPPI
MPPI
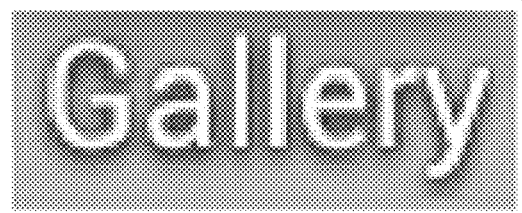
LPPI
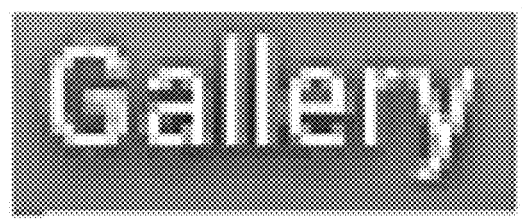

FIG. 9B
HPPI
MPPI
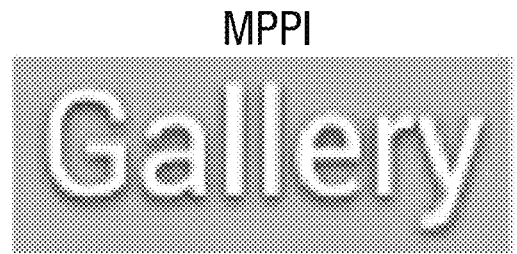
LPPI
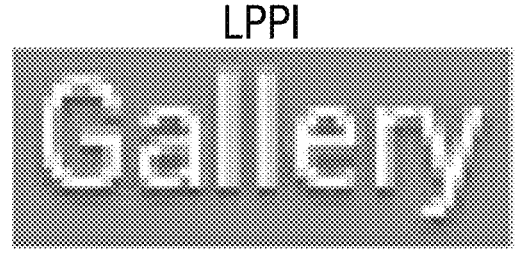

<RELATED ART APPLIED>

<TECHNOLOGY OF EXEMPLARY
EMBODIMENT APPLIED>

DISPLAY APPARATUS AND METHOD FOR PROVIDING FONT EFFECT THEREOF

CROSS-REFERENCE TO RELATED APPLICATION

This application claims priority from Korean Patent Application No. 10-2013-0115549, filed in the Korean Intellectual Property Office on Sep. 27, 2013, the disclosure of which is incorporated herein by reference in its entirety.

BACKGROUND

1. Field

Methods and apparatuses consistent with exemplary embodiments relate to a display apparatus and a method for providing a font effect thereof, more particularly, to a display apparatus configured to provide a font effect to a character that is input by a user, and a method for providing a font effect thereof.

2. Description

Display apparatuses may provide and display not only characters input by a user but also a font effect near or inside the input character. By providing a font effect to a character input by a user, a display apparatus may provide the characters with excellent visibility and design.

However, related art methods of providing font effects only provide fixed attribute values regardless of the size or thickness of the character, or the resolution of the display apparatus. For example, in the case where a font effect is set to provide a rim to a character whose size or thickness is adjustable (for example, stroke effect, glow effect, etc.), the font effect has a fixed attribute value (e.g., thickness value) which is applied even when the character's size or thickness has changed.

In this case, when the size of the character gets smaller or thinner, the font effect area becomes too large compared to the character, which causes the character to become unbalanced. Furthermore, when the size of the character gets larger or thicker, the quality of the font effect applied to the character deteriorates.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus capable of providing an optimized font effect to a character whose size is variable by applying different attribute values of the font effect according to at least one of characteristics of the character and characteristics of the display apparatus, and a method for providing a font effect thereof.

According to an aspect of an exemplary embodiment, there is provided a font effect providing method of a display apparatus, the method including determining an attribute value of a font effect according to at least one of a characteristic of a character and a characteristic of the display apparatus; rendering the font effect based on the determined attribute value and applying the rendered font effect to the character; and outputting the character to which the font effect is applied.

The attribute value of the font effect may include at least one of a thickness, position, and color of the font effect and is determined at least according to the size of the character.

In response to the font effect including a stroke effect of adding a rim to the input character, the determining of the attribute of the font effect may include determining a thickness value of the stroke effect such that the larger the size of the character, the thicker rim, and the smaller the size of the character, the thinner the rim.

The attribute value of the font effect includes at least one of a thickness, position, and color of the font effect and is determined at least according to a thickness of the character.

In response to the font effect including a stroke effect of adding a rim to the input character, the determining may include determining a thickness value of the stroke effect such that the thicker the character, the thicker the rim, and the thinner the input character, the thinner the rim.

The method may further include obtaining information about a resolution characteristic of the display apparatus; wherein the attribute value of the font effect is determined by considering at least the resolution characteristic of the display apparatus.

In response to the font effect including a glow effect of providing a smudging effect to the character, the determining may include reducing the smudging effect by reducing a filtering intensity of the glow effect such that the lower the resolution characteristic of the display apparatus, the lower the filtering intensity of the glow effect.

The characteristics of the character may include at least one of the language type of the character, styling of the character, and stroke complexity of the character.

The method may further include obtaining fort information that includes a type of the font effect to be applied to the character, and the type of the font effect may include at least one of a shadow effect, glow effect, bevel effect, emboss effect, color overlay effect, stroke effect, linear gradient effect, and pattern effect.

The method may further include turning on or off a function of adjusting an attribute value of the font effect according to characteristics of the input character in accordance may be turned on or off by a user setting.

The character may be one of a character input from a user and a character received from outside the display apparatus.

According to an aspect of another exemplary embodiment, there is provided a display apparatus including: an inputter configured to receive a user command input; a controller configured to determine an attribute value of a font effect according to at least one of a characteristic of a character input through the inputter and a characteristic of the display apparatus, render the font effect based on the determined attribute value, and apply the rendered font effect to the character input through the inputter; and an outputter configured to output the character to which the font effect is applied.

The attribute of the font effect includes least one of a thickness, position, and color of the font effect and the controller determines the attribute of the font effect according to the size of the input character.

In response to the font effect including a stroke effect of adding a rim to the input character, the controller may determine thickness value of the stroke effect such that the larger the size of the input character, the thicker the rim, and the smaller the size of the input character, the thinner the rim.

The attribute of the font effect includes at least one of a thickness, position, and color of the font effect and the controller determines the attribute of the font effect according to a thickness of the input character.

In response to the font effect including a stroke effect of adding a rim to the input character, the controller may determine a thickness value of the stroke effect such that the thicker the input character, the thicker the rim, and the thinner the input character, the thinner the rim.

The controller may obtain information about a resolution characteristic of the display apparatus, and to determine the attribute value of the font effect by at least considering the resolution characteristic of the display apparatus.

In response to the font effect including a glow effect of providing a smudging effect to the character, the controller may reduce the smudging effect by reducing a filtering intensity of the glow effect such that the lower the resolution of the display apparatus, the lower the filtering intensity of the glow effect.

The characteristics of the input character may include at least one of the language type of the input character, styling of the input character, and stroke complexity of the input character.

The inputter may receive font information that may include a type of the font effect to be applied to the input character, and the type of the font effect may include at least one of a shadow effect, glow effect, bevel effect, emboss effect, color overlay effect, stroke effect, linear gradient effect, and pattern effect.

The controller may turn a function of adjusting an attribute value of the font effect on or off according to the characteristic of the input character in accordance with a user setting input through the inputter.

According to an aspect of another exemplary embodiment, there is provided a display apparatus including: an inputter configured to receive character information indicating at least a characteristic of a character and font effect information indicating at least a font effect; a controller configured to determine an attribute value of the font effect according to at least one of the characteristic of the character and a characteristic of the display apparatus, to render the font effect based on the determined attribute value, and to apply the rendered font effect to the character; and an outputter configured to output the character to which the font effect is applied.

According to an aspect of another exemplary embodiment, there is provided a display apparatus including a controller configured to adjust a property of a font effect that is to be applied to a character in accordance a characteristic of the character to be displayed; and a display configured to display the character applied with the font effect with the adjusted property.

The display apparatus may further include an inputter configured to receive a pinch operation from a user to decrease a size of the character and an expansion operation to increase the size of the character, wherein the controller is configured to, in response to the inputter receiving the pinch operation, decrease at least one of a size and a thickness of the font effect, and in response to the inputter receiving the expansion operation, increase at least one of the size and the thickness of font effect.

The controller is configured to, in response to the inputter receiving the pinch operation, decrease at least one of the size and the thickness of the font effect in proportion to the decrease in the size of the character, and in response to the inputter receiving the expansion operation, increase at least one of the size and the thickness of font effect in proportion to the increase in the size of the character.

BRIEF DESCRIPTION OF THE DRAWINGS

The above and/or other aspects will be more apparent by describing certain exemplary embodiments with reference to the accompanying drawings, in which:

FIG. 3 is a block diagram illustrating a plurality of modules stored in a storage according to an exemplary embodiment;

FIG. 5B is a view illustrating a character where a stroke effect is applied according to character size, according to an exemplary embodiment;

FIG. 6A is a view illustrating a character where a stroke effect is applied and pixel of the character according to character thickness, according to related art;

FIG. 7A is a view illustrating a character where a stroke effect is applied according to language type of related art;

FIG. 9A is a view illustrating a character where a font effect is applied according to resolution of a display apparatus of related art;

FIG. 9B is a view illustrating a character where a font effect is applied according to a display apparatus of an exemplary embodiment;

DETAILED DESCRIPTION

Figure 1:
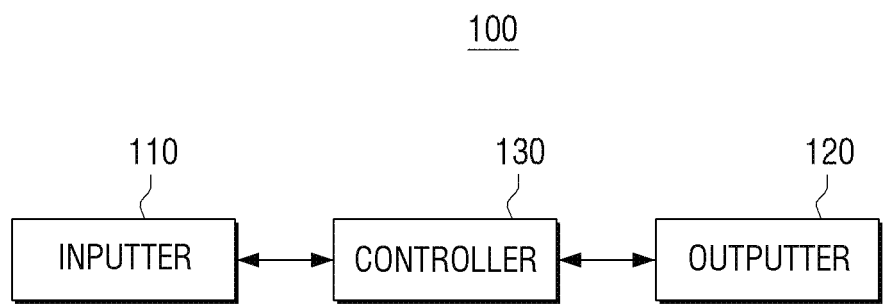
FIG. 1 is a block diagram schematically illustrating a configuration of a display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram schematically illustrating a configuration of a display apparatus 100 according to an exemplary embodiment. As illustrated in FIG. 1, the display apparatus 100 includes an inputter 110, outputter 120 and controller 130. Herein, the display apparatus 100 may be a smart phone, but this is just an exemplary embodiment, and the display apparatus 100 may be embodied as one of other display apparatuses that may output characters such as, for example, a smart TV, tablet personal computer (PC), desktop PC, notebook PC, etc.

The inputter 110 receives a user command for controlling the display apparatus 100. For example, in some embodiments, the user command received by the inputter 110 is for obtaining character information of a character that is input by the user. In addition, the inputter 110 may receive a user command for setting various font effects. As used herein the term character refers to any type of symbolic script (e.g., Kana, Kanji, Hanji, Hangul, etc.), letter, number, icon, image, special character (e.g., *, +, >, $, etc.), etc.

The inputter 110 may be embodied as a touch screen, but this is just an exemplary embodiment, and the inputter 110 may be embodied as one of various inputting apparatuses such as, for example, a keypad, pen, mouse, keyboard, remote control, etc.

A controller 130 controls the outputter 120 to output image data. The outputter 120 may apply a font effect to the character input through the inputter 110 and then output the character with the font effect.

The outputter 120 may be embodied as a display unit, but this is just an exemplary embodiment, and the outputter 120 may be embodied as any type of apparatus that can output visual information such as, for example, a printer, etc.

The controller 130 controls the overall operations of the display apparatus 100 according the user command input through the inputter 110. The controller 130 may determine an attribute value of a font effect according to characteristics of the character input through the inputter 110, render the font effect based on the determined attribute value, and apply the rendered font effect to the character.

More specifically, the controller 130 may obtain character information input through the inputter 110 and font effect information set in the display apparatus 100. The font effect may be, for example, a graphical element provided inside or outside the character.

The font effect information obtained by the controller 130 may include the type of font effect to be applied to the input character. The available types of font effects include at least one of a shadow effect, glow effect, bevel effect, emboss effect, color overlay effect, stroke effect, linear gradient effect, pattern effect, etc.

Furthermore, the controller 130 may determine an attribute value of the font effect according to at least one of the characteristics of the input character and attributes of the display apparatus 100. According to an exemplary embodiment, the controller 130 may determine at least one of a thickness, position, and color of the font effect according to the size of the input character.

According to an exemplary embodiment, in the case of adding a rim to a character to which a font effect is applied, the controller 130 determines a thickness value of a stroke effect such that the larger the size of the input character, the thicker the rim, and the smaller the size of the input character, the thinner the rim of the input character.

According to another exemplary embodiment, the controller 130 may determine at least one of a thickness, position, and color of the font effect according to the thickness of the input character. More specifically, in the case of a stroke effect of adding a rim to a character where a font effect is input, the controller 130 may determine the thickness value of the stroke effect such that the thicker the input character, the thicker the rim, and the thinner the input character, the thinner the rim.

Besides the aforementioned, the controller 130 may determine an attribute value of the font effect according to at least one of the language type of the input character, style of the input character, and the stroke complexity of the input character. In addition, the controller 130 may determine an attribute value of another font effect besides the stroke effect according to the characteristics of the input character.

The controller may determine an attribute value of the font effect according to one font effect set in the display apparatus 100, but this is just an exemplary embodiment, and in the case where a plurality of font effects are set in the display apparatus 100, the controller 130 may determine an attribute value of the font effect according to the plurality of font effects.

In addition, the controller 130 may obtain information on the resolution characteristics of the display apparatus 100, and determine an attribute value of the font effect considering the resolution characteristics of the display apparatus 100. Herein, the controller 130 may determine an attribute value of the font effect considering the not only the characteristics of the resolution of the display apparatus 100 but also characteristics related to the resolution such as Pixel Per Inch (PPI) and Dots Per Inch (DPI).

According to an exemplary embodiment, in the case of a glow effect providing a smudging effect to the input character to which a font effect is input, the controller 130 may express the character such that the higher the resolution of the display apparatus 100, the higher the smudging effect of the character, and that the lower the resolution, the lower the smudging effect of the character.

In addition, the controller 130 may render the font effect based on the determined attribute value, and apply the rendered font effect to the input character.

There may be a user settable setting that the user can set through the inputter 110, which causes the controller 130 to turn a function for adjusting an attribute value of the font effect on or off according to the characteristics of the input character.

By the aforementioned display apparatus 100, it is possible to render the font effect considering the characteristics of the input character and the resolution of the display apparatus, thereby applying an optimal font effect to the input character and providing it to the user.

Hereinbelow, the display apparatus is explained in further detail with reference to FIGS. 2 to 10B.

Figure 2:
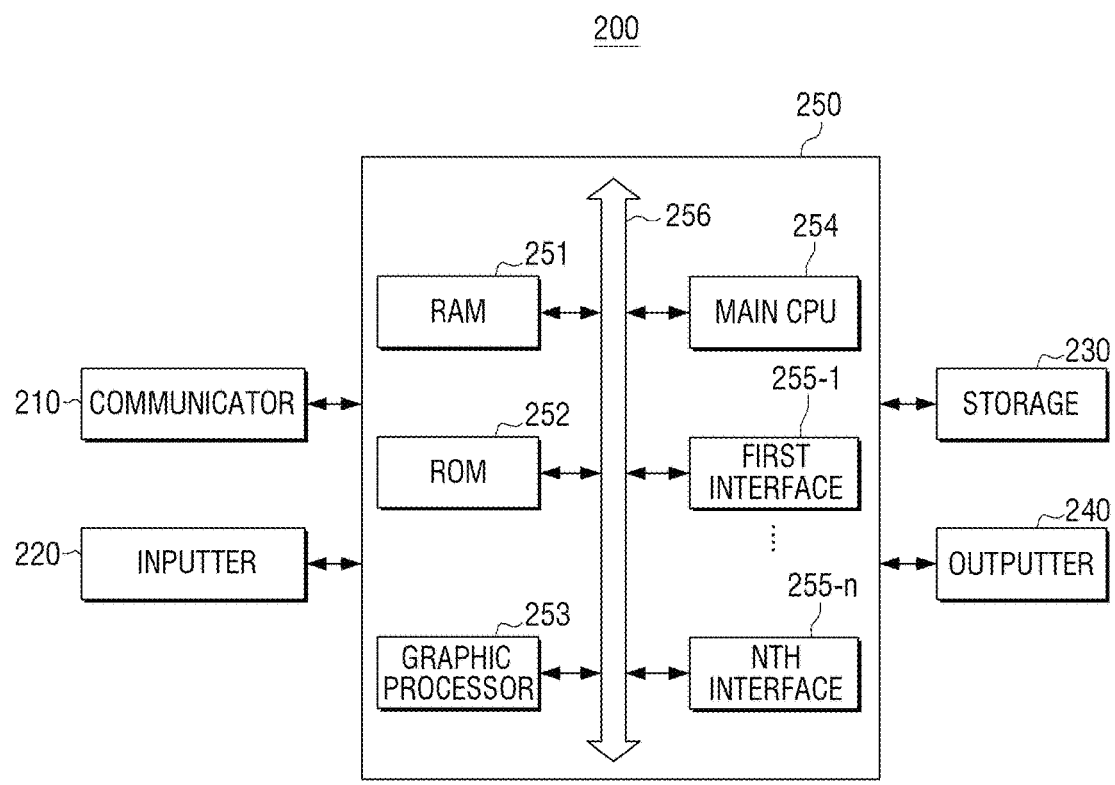
FIG. 2 is a block diagram illustrating in detail a configuration of a display apparatus according to an exemplary embodiment.

FIG. 2 is a block diagram illustrating in detail a configuration of a display apparatus 200, according to an exemplary embodiment. As illustrated in FIG. 2, the display apparatus 200 includes a communicator 210, inputter 220, storage 230, outputter 240, and controller 250.

FIG. 2 illustrates the configurative elements based on the case where the display apparatus 200 is an apparatus provided with various functions such as a character outputting function, font effect providing functions, etc. Therefore, depending on the particular implementation of this exemplary embodiment, some of the configurative elements may be omitted or changed, or other configurative elements may be added.

The communicator 210 is for performing communication with various types of external devices and/or external servers according to various types of communication methods. The communicator 210 may include various communication chips such as, for example, a Wi-Fi chip, a Bluetooth chip, a Near Field Communication (NFC) chip, wireless communication chip, etc. Herein, Wi-Fi chip, Bluetooth chip, NFC chip, and wireless communication chip perform communication in Wi-Fi method, Bluetooth method, NFC method, and other communication methods, respectively. Of these, an NFC chip refers to a chip operating in the NFC method which uses 13.56 MHz bandwidth of various RF-ID frequency bandwidths: 135 kHz, 13.56 MHz, 433 MHz, 860-960 MHz, and 2.45 GHz. In the case of using a Wi-Fi chip or Bluetooth chip, it is possible to transceive various connection information such as Service Set IDentification (SSID), a section key, etc., and use it to transceive various information after connection communication. A wireless communication chip refers to a chip performing communication according to various communication standards such as IEEE, ZigBee®, 3rd Generation (3G), 3rd Generation Partnership Project (3GPP), Long Term Evolution (LTE), etc.

The communicator 210 may receive, as an input, image information and/or character information from an external server or apparatus.

The inputter 220 may receive a user command for controlling the display apparatus 200. The inputter 220 may receive an input of a user command for obtaining character information that the user intends to write. In addition, the inputter 220 may receive an input of a user command for setting at least one font effect to be applied to the display apparatus 200. In addition, the inputter 220 may receive an input of a user command for turning a function for determining an attribute value of a font effect on or off according to the characteristics of the input character.

The inputter 220 may be embodied as a touch screen, but this is just an exemplary embodiment, and the inputter 220 may be embodied as another inputting apparatus that may control the display apparatus 200 such as a remote control, pointing device, mouse, keyboard, keypad, etc.

The storage 230 stores various modules for driving the display apparatus 200. For example, in the storage 230, software including a base module, sensing module, communication module, presentation module, web browser module, service module, etc., may be stored. Herein, the base module includes a module that processes the signal transmitted from each hardware included in the display apparatus 200 and transmits the processed signal to a superior layer module. The sensing module includes a module that collects information from various sensors, and analyzes and manages the collected information. The sensing module may include a face recognition module, voice recognition module, motion recognition module, NFC recognition module, etc. The presentation module includes a module for configuring a display screen. The presentation module may include a multimedia module for reproducing and outputting multimedia contents, and UI rendering module that performs UI and graphic processing. The communication module includes a module for performing communication outside of the display apparatus 200. The web browser module includes a module that performs web browsing and accesses a web server. The service module includes a module that includes various applications for providing various services.

In addition, the storage 230 may store various modules for determining attributes of a font effect according to the characteristics of a character. As illustrated in FIG. 3, the storage 230 may include a character size determining module 231, character thickness determining module 232, font effect attribute controlling module 233, font effect generating module 234, font effect applying module 235, and font effect transmitting module 236.

The character size determining module 231 performs a role of determining the size of the character to which a font effect will be applied. The character thickness determining module 232 performs a role of determining the thickness of the character to which a font effect will be applied. The font effect attribute controlling module 233 performs a role of changing a font effect according to the attribute value of the determined according to the characteristics of the character. The font effect generating module 234 performs a role of rendering the font effects per type from the character images. The font effect applying module 235 performs a role of applying a font effect to the character according to the type of the font effect. The font effect transmitting module 236 performs a role of transmitting the character to which a font effect is applied to the outputter 240.

The plurality of modules as illustrated in FIG. 3 is just an exemplary embodiment, and other modules may be included for providing font effects according to the characteristics of the input character. For example, various modules such as language type determining module, stroke complexity determining module, display resolution determining module, etc., may be further included.

Going back to FIG. 2, the outputter 240 outputs image data according to control by the controller 250. The outputter 240 may output a character to which a font effect is applied by the controller 250.

The outputter 240 may be embodied as a Liquid Crystal Display (LCD), but this is just an exemplary embodiment, and the outputter 240 may be embodied as one of various displays such as Organic Light-Emitting Diode (OLED), thin film transistor (TFT), Cathode-Ray Tube (CRT), etc. In addition, the outputter 240 may not only be embodied as a display unit but also as any type of visual information outputting apparatus such as, for example, a printer, etc.

The controller 250 controls the overall operations of the display apparatus 200 using various programs stored in the storage 230.

As illustrated in FIG. 2, the controller 250 includes a random access memory (RAM) 251, a read-only memory (ROM) 252, a graphic processor 253, a main central processing unit (CPU) 254, first to nth interfaces 255-1 to 255-n, and buses 256. Herein, the RAM 251, the ROM 252, the graphic processor 253, the main CPU 254, and the first to nth interfaces 255-1 to 255-n may be connected to one another through buses 256.

In the ROM 252, a command set for system booting is stored. When a turn on command is input and power is supplied, the main CPU 254 copies an operating system (O/S) stored in the storage 230 to the RAM 251 according to the command stored in the ROM 252, and executes the O/S to boot the system. When the booting is completed, the main CPU 254 copies various application programs stored in the storage 230 to the RAM 251, and executes the application programs copied in the RAM 251 to perform various operations.

The graphic processor 253 generates a screen including various objects such as an icon, image, text, etc., using a calculator (not illustrated) and renderer (not illustrated). The calculator calculates an attribute value such as a coordinate value, format, size, color, etc., for displaying of each object according to the layout of the screen using a control command received from the inputter 220. The renderer generates a screen of various layouts including the objects based on the attribute value calculated in the calculator. The screen generated in the renderer is displayed within the display area of the outputter 240.

The main CPU 254 accesses the storage 230, and performs booting using the O/S stored in the storage 230. In addition, the main CPU 254 performs various operations using various programs, contents, data, etc., stored in the storage 230.

The first to nth interfaces 255-1 to **255-*n* are connected to each of the aforementioned configuration elements via the busses 256. One of those interfaces 255-1 to 255-*n*** may be a network interface that is connected to an external apparatus through a network.

The controller 250 may determine an attribute value of a font effect according to the characteristics of the character input through the inputter 220, render the font effect based on the determined attribute value, and apply the rendered font effect to the input character and output the character to the outputter 240.

More specifically, the controller 250 may obtain character information of the character input through the inputter 220. The character information of the input character may include various information about the characteristics of the character such as the unique ID of the character, control point information related to the character format information, connection information defining the connecting attributes of the control point, metric information related to arrangement of a plurality of characters, hinting information for aligning boundary lines of a character in a grid, character size information, character thickness information, information on the language type of the character, style information of the character, etc.

In addition, the controller 250 may obtain font effect information including information about at least one font effect set in the display apparatus 200. Herein, the font effect information may include the type of the font effect to be applied to the input character. The font effect type may include at least one of a shadow effect, glow effect, bevel effect, emboss effect, color overlay effect, stroke effect, linear gradient effect, pattern effect, etc.

Figure 4A:
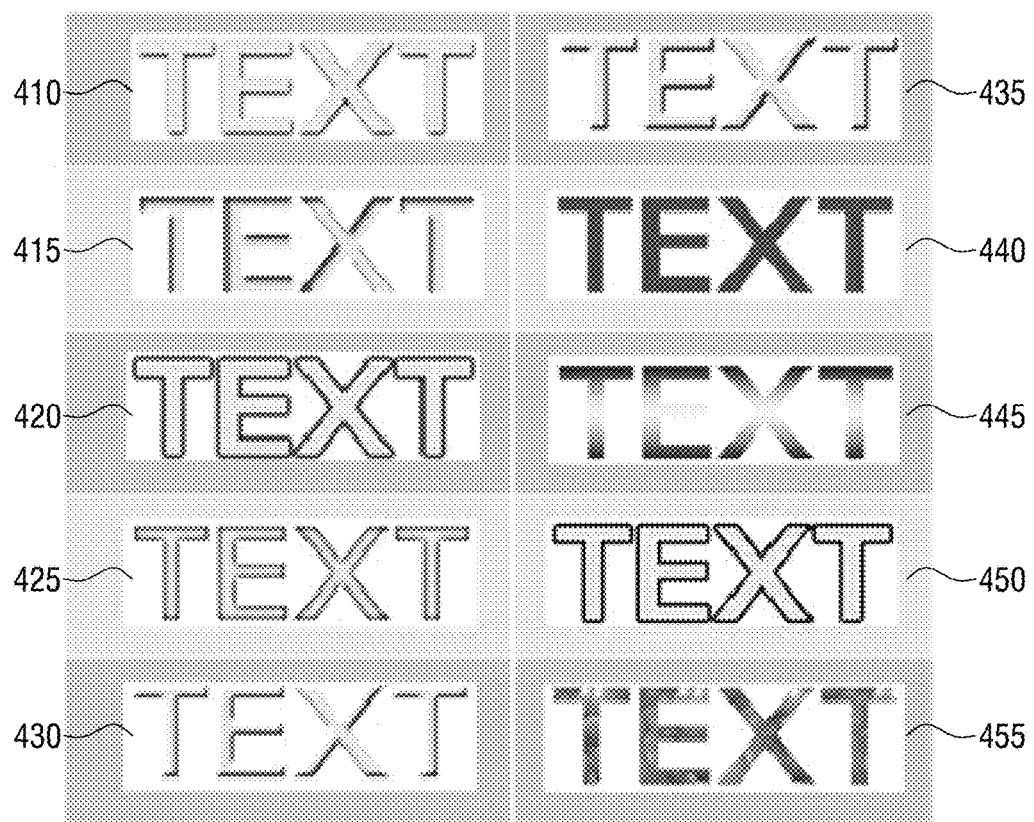
FIGS. 4A and 4B are views for explaining various font effects.
Figure 4B:
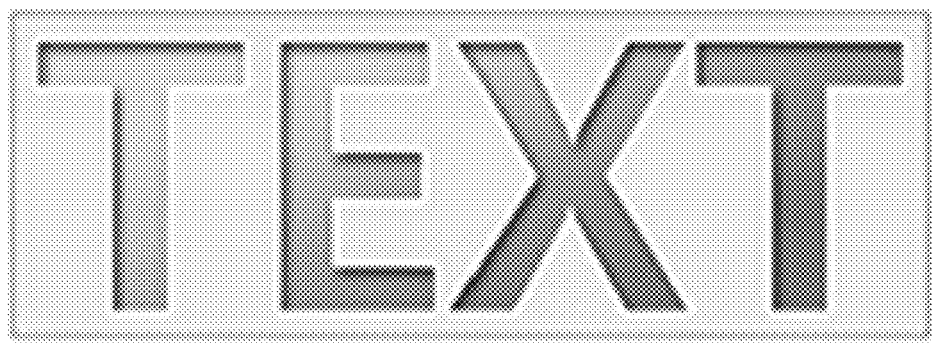

Hereinbelow is an explanation about various font effects. Referring to FIGS. 4A and 4B, the font effect may include an outer shadow effect 410 of generating a shadow in the outskirts of a character and an inner shadow effect 415 of generating a shadow inside a character. The glow effect may include an outer glow effect 420 providing a smudging effect in the outskirts of a character and an inner glow effect 425 providing a smudging effect inside a character. In addition, there may be a bevel effect 430 and emboss effect 435 for giving a three-dimensional effect to a character. In addition, there may be a color overlay effect 440 providing an effect as if color is painted over a character, a linear gradient effect 445 providing gradation to a character, a stroke effect 450 providing a rim light in the outskirts of a character, and a pattern effect 455 of providing a particular pattern image inside a character.

In addition, as illustrated in FIG. 4A, a plurality of font effects may be applied at the same time. For example, as illustrated in FIG. 4B, the controller 250 may apply a stroke effect 450, inner shadow effect 415 and linear gradient effect 445 to a character at the same time. Of course the controller 250 may apply any combination of font effects, and the example shown in FIG. 4B is only one such combination.

Other font effect may also be applied to the present disclosure besides the aforementioned font effects. For example, various font effects such as a wave effect, drop shadow effect, background effect, satin effect, etc., may be applied to the concept.

In addition, the controller 250 may determine an attribute value of a font effect according to the characteristics of the input character. Herein, the attribute value of the font effect may be one of various attribute values such as, for example, the thickness, position, or color, etc., of the font effect.

The controller 250 may determine an attribute value of a font effect according to the size of the input character. For example, in the case of a stroke effect of adding a rim to the character to which a font effect is input, the controller 250 may determine a rim thickness value of the stroke effect according to the size of the input character.

More specifically, the controller 250 may determine the thickness value of the stroke effect such that the larger the size of the input character, the thicker the rim, and that the smaller the size of the input character, the thinner the rim. Herein, the thickness value of the font effect may be determined using the number of pixels or grayscale applied to the pixels. Hereinbelow is an explanation about a character to which a stroke effect is applied according to size of the character according to related art and to an exemplary embodiment, with reference to FIGS. 5A and 5B, respectively.

Figure 5A:
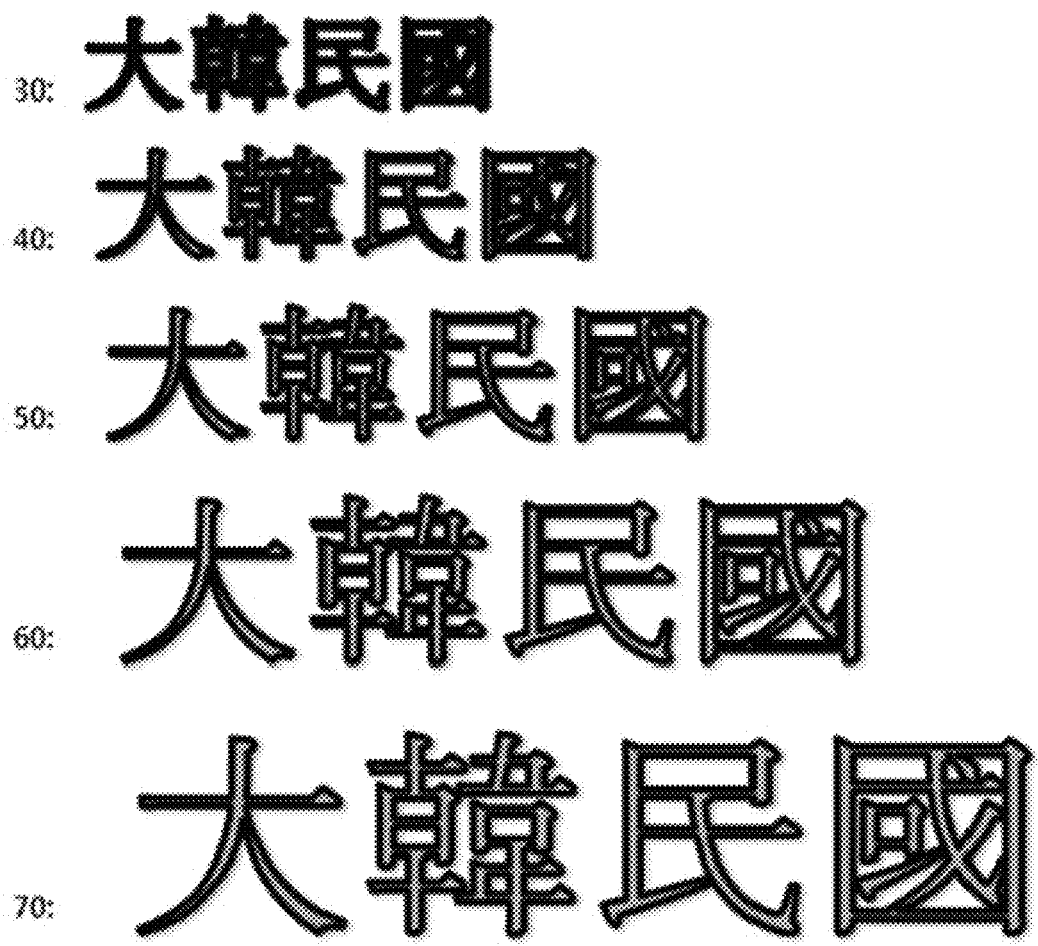
FIG. 5A is a view illustrating a character where a stroke effect is applied according to the character size, according to related art.

FIG. 5A is a view illustrating "(大韓民國)" to which a stroke effect is applied according to the size of the character (i.e., sizes 30, 40, 50, 60, and 70) according to related art. As illustrated in FIG. 5A, a rim of a constant thickness is applied to the character regardless of the size of the character. Due to this, in the case of a smaller character (e.g., 30, 40, 50, 60), the rim gets too thick. In the case, of the much smaller character (e.g., 30, 40) it becomes impossible to provide an appropriate stroke effect to the user.

Figure 5B:
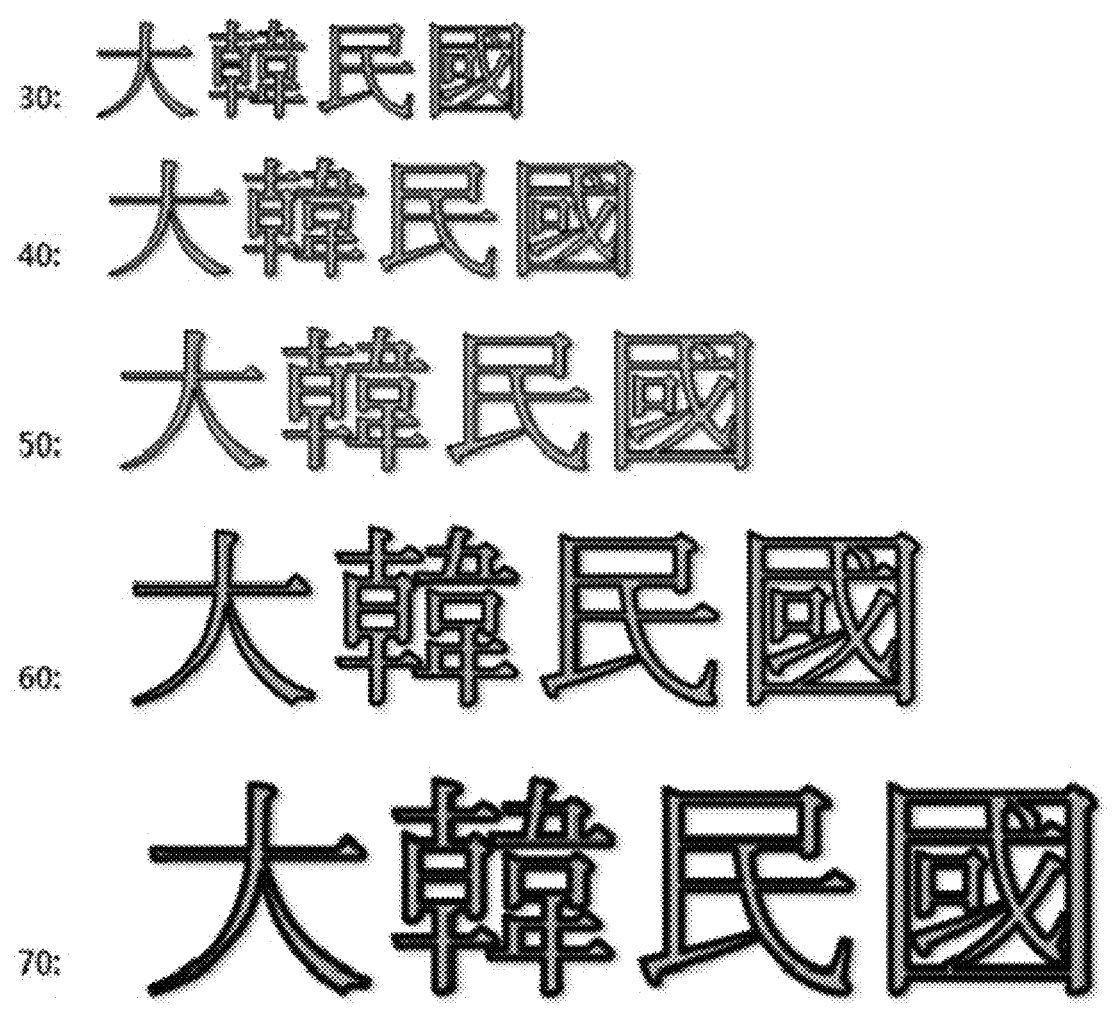

FIG. 5B is a view illustrating "(大韓民國)" to which a stroke effect is applied according to size of the character (i.e., sizes 30, 40, 50, 60, and 70) according to an exemplary embodiment. As illustrated in FIG. 5B, there is provided a stroke effect of different thickness according to the size of the character. That is, if the size of the character is small, a thin rim is provided, and if the size of the character is large, a thick rim is provided. Thus, the user is provided with an appropriate stroke effect regardless of the size of the character. This is because there is a direct correlation between the size of the character and the size of the font effect that is applied to the character. In contrast, in the related art shown in FIG. 5A the size of the font effect is fixed making it impossible to apply an appropriately sized font effect to some character sizes.

According to the above-mentioned exemplary embodiment, in a case where the size of the character changes due to expansion or reduction of the display screen according to a user command (for example, pinch operation) in a smart phone, an attribute value of the font effect is determined and applied according to the size of the character in real time, thereby increasing the usability of the user because the size of the font effect is variable and changed according to one or more attributes of the character (e.g., size, thickness, type, etc.). Of course, the font effect can change based on the typography as well (e.g., typefaces, point size, line length, leading, line spacing, tracking, kerning, etc.)

In addition, the controller 250 may determine an attribute value of a font effect according to the thickness of the input character. For example, in the case where the font effect is a stroke effect of adding a rim to the input character, the controller 250 may determine the rim thickness value of the stroke effect according to the thickness of the input character.

More specifically, the controller 250 may determine the thickness value of the stroke effect such that the thicker the input character, the thicker the rim, and that the thinner the input character, the thinner the rim. Herein, the thickness value of the font effect may be determined using the number of pixels and grayscale applied to the pixels. Hereinbelow is an explanation about characters where a stroke effect is applied according to the character thickness according to the related art and to an exemplary embodiment with reference to FIGS. 6A and 6B, respectively.

FIG. 6A is a view illustrating "(大韓民國)" where a stroke effect is applied according to the character thickness according to related art. As illustrated in the upper and lower side of FIG. 6A, a same thickness (4 pixels) rim is applied to both the case where the thickness of the character is large 610, and the case where the thickness of the character is small 620. Thus, in the case of a thin character, the rim is too thick, making it impossible to provide an appropriate stroke effect to the user.

Figure 6B:
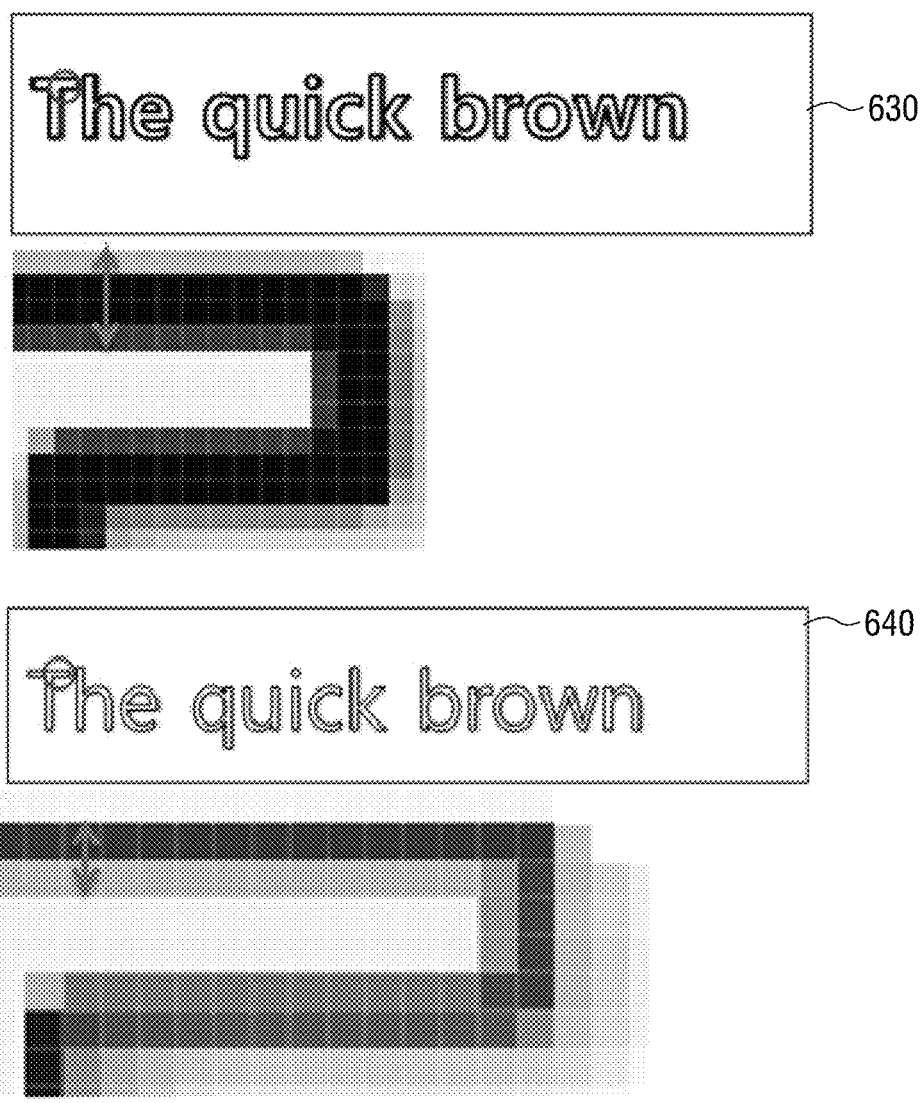
FIG. 6B is a view illustrating a character where a stroke effect is applied and pixel of the character according to character thickness, according to an exemplary embodiment.

FIG. 6B is a view illustrating "(大韓民國)" where a stroke effect is applied in proportion to the character size in accordance with an exemplary embodiment. As illustrated in FIG. 6B, there is provided a stroke effect of different thickness according to the thickness of character. That is, as illustrated in the upper side of FIG. 6B, in the case of a thick character 630, a thick rim (4 pixels) is provided, and as illustrated in the lower side of FIG. 6B, in the case of a thin character 640, a thin rim (2 pixels) is provided. Thus, the user is provided with an appropriate stroke effect according to thickness of character.

Figure 7B:
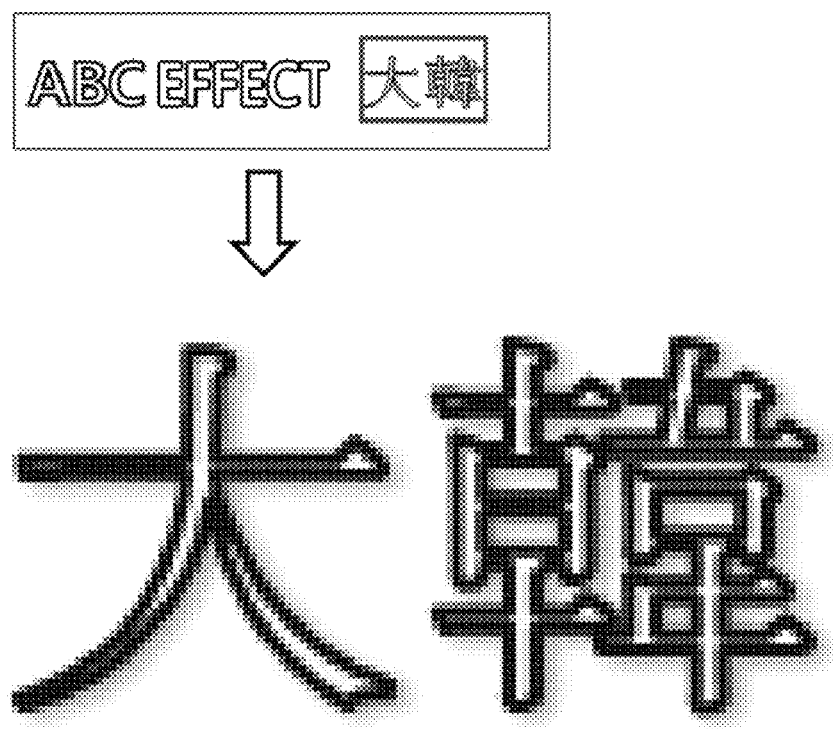
FIG. 7B is a view illustrating a character where a stroke effect is applied according to language type, according to an exemplary embodiment.

As explained in the aforementioned exemplary embodiment, the controller 250 may change the thickness of the stroke effect according to the size and thickness of the character, but this is just an exemplary embodiment, and the thickness of the stroke effect may be determined according to other characteristics of the character. For example, the controller 250 may change the thickness of the stroke effect according to the language type of the character. More specifically, as illustrated in FIG. 7A, in the related art, the thickness of the stroke effect is applied regardless of the language type of the character. In the case of highly complex Chinese characters, it is not possible to provide an appropriate stroke effect to the user. However, in the present disclosure, as illustrated in FIG. 6B, an appropriate stroke effect may be provided according to the language type of the character by adjusting the thickness of the stroke effect to be thin. Besides the aforementioned, the controller 250 may change the thickness of the stroke effect according to various characteristics such as the stroke complexity of the character, the styling of the character, etc.

In the aforementioned exemplary embodiment, it is explained that the controller 250 may change an attribute value regarding the thickness of the font effect according to the characteristics of the character, but this is just an exemplary embodiment, and it is possible to change an attribute value regarding other attributes of the font effect according to the characteristics of the character. For example, in the case where the font effect set in the display apparatus 200 is a shadow effect, the controller 250 may change the attribute value regarding the position of the shadow effect according to the size of the character. Hereinbelow is an explanation about characters where a shadow effect is applied according to the related art and according to an exemplary embodiment with reference to FIGS. 8A and 8B.

Figure 8A:
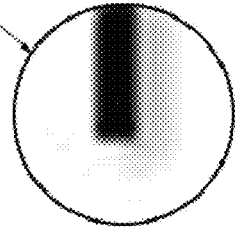
FIG. 8A is a view illustrating a character where a shadow effect is applied according to character size of related art.

FIG. 8A is a view illustrating "The quick brown" where a shadow effect is applied according to the size of the character according to related art. As illustrated in FIG. 8A, a shadow effect is applied to a fixed position regardless of the size of the character. Thus, in the case of a small character, the distance between the character and shadow becomes too close, and it is not possible to provide an appropriate shadow effect.

Figure 8B:
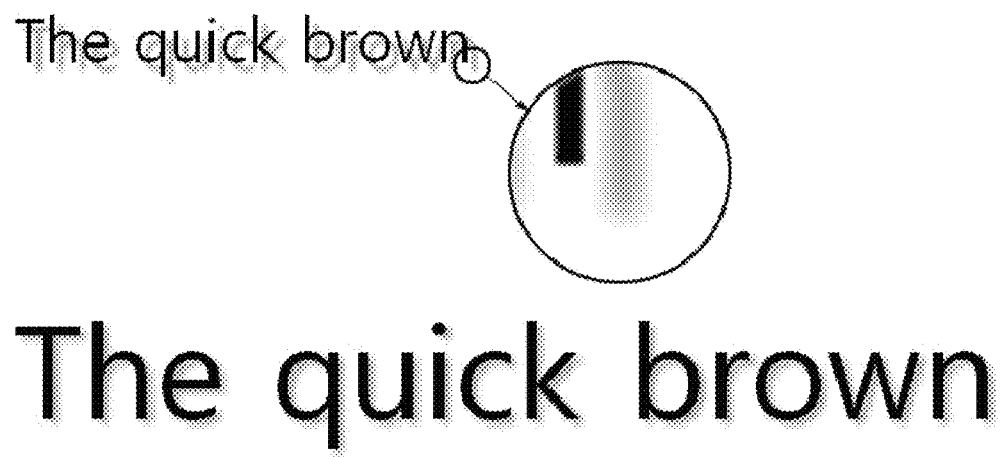
FIG. 8B is a view illustrating a character where a shadow effect is applied according to character size of an exemplary embodiment.

FIG. 8B is a view illustrating "The quick brown" where a shadow effect is applied according to the size of the character according to an exemplary embodiment. As illustrated in FIG. 8B, a shadow effect is provided in different positions according to the size of the character. That is, in the case of a small character, a shadow effect is provided at a farther distance than the case of a large character. Thus, the user is provided may be provided with an appropriate shadow effect even when the size of the character is small. In other words, the position of the shadow effect relative to the character is variable and depends on a characteristic (e.g., size) of the character. In contrast, the position of the shadow effect relative to the character in the related art is fixed (e.g., the same) regardless of the characteristics of the character. Thus, in the exemplary embodiments described above, the font effect changes as a function of one or more characteristics of the character.

By way of another example, the controller 250 may change an attribute value regarding color of the font effect according to the characteristics of the character. Herein, the attribute value regarding color of the font effect may include both an attribute value regarding the brightness of the font effect and an attribute value regarding the chroma of the font effect. For example, in the case where the font effect set in the display apparatus 200 is a glow effect, the controller 250 may control such that the larger the size of the character or thicker the character, the darker the color of the smudging, and that the smaller the size of the character or thinner the character, the lighter the color of the smudging.

In the aforementioned exemplary embodiment, it is explained that the controller 250 may change an attribute value of the stroke effect, shadow effect, color, etc., according to the characteristics of the character, but this is just an exemplary embodiment, and the controller 250 may also change an attribute value of other font effects according to the characteristics of the character.

For example, in the case where the font effect set in the display apparatus 200 is a bevel effect or emboss effect, the controller 250 may determine an attribute value having a smaller 3-dimensional sensation as the size or thickness of the character gets larger, and determine an attribute value having a higher 3-dimensional sensation as the size or thickness of the character gets smaller. By way of another example, in the case where the font effect set in the display apparatus 200 is a shadow effect, the controller 250 may determine an attribute value such that the larger the size or thickness of the character, the larger the size of the shadow, and that the smaller the size or thickness of the character, the smaller the shadow.

In addition, the controller 250 may change an attribute value of various font effects such as a color overlay effect, linear gradient effect, pattern effect, wave effect, etc., according to the characteristics of the character.

In addition, the controller 250 may obtain information on the resolution characteristics of the display apparatus 200, and may determine an attribute value of the font effect considering the resolution characteristics of the display apparatus 200. That is, since the resolution or characteristics related to the resolution such as PPI, DPI, etc., differ depending on the type of the display apparatus 200, the controller 250 may determine an attribute value of the font effect according to the resolution characteristics of the display apparatus 200.

For example, the controller 250 may determine an intensity of filtering of the font effect according to the resolution characteristics. Hereinbelow is an explanation about characters where a shadow effect is applied according to the PPI of the display apparatus 200 according to the related art and according to an exemplary embodiment with reference to FIGS. 9A and 9B, respectively.

FIG. 9A is a view illustrating "Gallery" where a shadow effect is applied according to the PPI of a display apparatus according to related art. As illustrated in FIG. 9A, when the PPI is high (HPPI), an appropriate shadow effect is provided to the character, but the shadow effect gets unclear as the PPI gets lower (e.g., when the PPI is mid (MPPI) and when the PPI is low (LPPI)), thereby making it difficult to recognize the character clearly.

FIG. 9B is a view illustrating "Gallery" where a shadow effect is applied according to the PPI of the display apparatus 200 according to an exemplary embodiment. As illustrated in FIG. 9B, as the PPI gets lower, the filtering intensity is adjusted and a shadow effect with a minimum smudging effect is provided. Thus, the user may be provided with an appropriate font effect even when the resolution of the display apparatus is low. In other words, the shadow effect applied to the character is variable and depends on a characteristic (e.g., resolution, PPI, DPI, etc.) of the display apparatus 200. In contrast, the shadow effect applied to the character in the related art is fixed (e.g., the same) regardless of the characteristics of the display apparatus 200. Thus, in the exemplary embodiments described above, the font effect changes as a function of one or more characteristics of the display apparatus 200.

In the aforementioned exemplary embodiment, it is explained that the intensity of filtering of a shadow effect differs according to the PPI of the display apparatus, but this is just an exemplary embodiment, and an attribute value of other font effects may also be determined according to the resolution characteristics of the display apparatus. For example, in the case where a glow effect is set in the display apparatus 200, when the resolution of the display apparatus 200 is low, the controller 250 may minimize the smudging effect by adjusting the intensity of filtering.

As aforementioned, it is possible to provide different attribute values of the font effect according to the resolution of the display apparatus 200, thereby enabling the user to be provided with the optimal font effect, no matter what kind of display apparatus 200 the user is using.

Of course, the font effect may change as a function of one or more characteristics of the display apparatus 200 and one or more characteristics of the character. For example, the controller 250 may render the font effect according to the attribute value of the font effect determined by the character characteristics and the resolution of the display apparatus 200. In addition, the controller 250 may render the character according to the obtained character information, apply the font effect to the rendered character, and output it to the outputter 240.

The controller 250 may turn a function for adjusting an attribute value of the font effect on or off according to the characteristics of the character input according to the user setting input through the inputter 220. Herein, the user may turn the function of adjusting the attribute value of the font effect on or off according to the character characteristics through a (User Interface) UI or a particular operation (for example, an operation of continuously touching the touch screen for several seconds).

Hereinbelow is an explanation about an exemplary embodiment that provides a different attribute value of the font effect according to the character characteristics with reference to FIG. 10A and FIG. 10B.

Figure 10A:
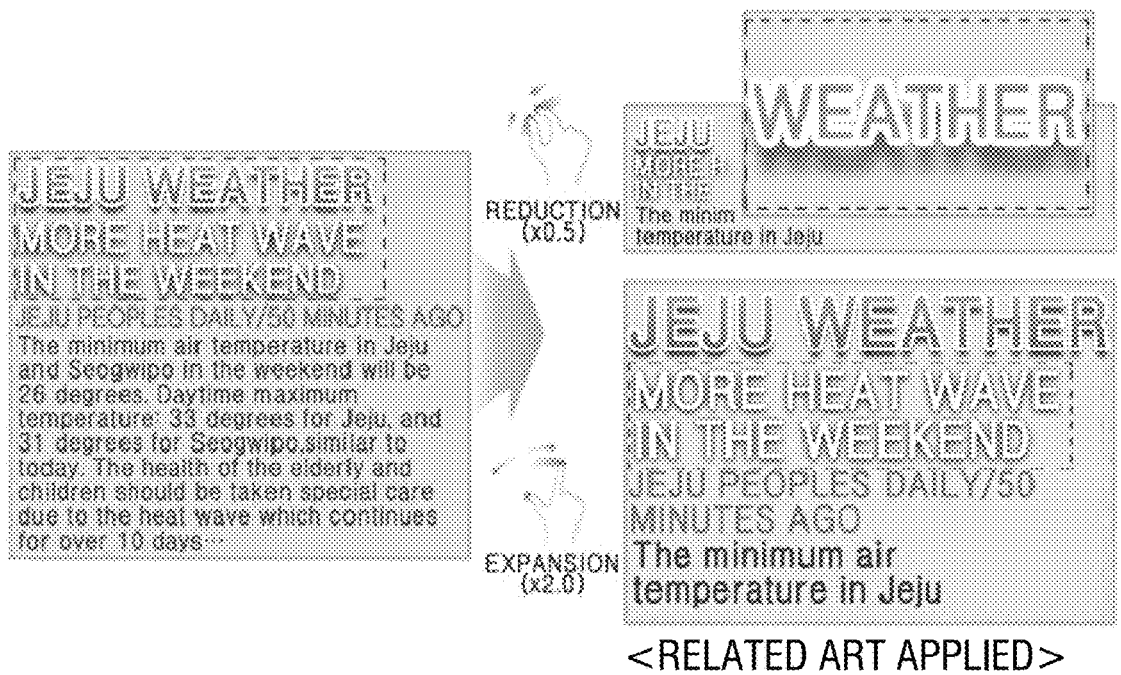
FIGS. 10A and 10B are views for comparing the font effects between related art and the present disclosure.

FIG. 10A is a view for explaining a case where a font effect is applied to a character when a display screen is expanded or reduced according to a user manipulation according to the related art. As illustrated in the left side of FIG. 10A, in the case where a pinch operation is input for expanding the size of the display screen while a character is displayed on the display screen, the size of the character gets smaller as illustrated in the right side of FIG. 10A. Herein, the size of the character gets smaller, but the thickness is the same, therefore the readability and/or visibility is reduced because the font effect becomes stronger compared to the size of the character. In addition, as illustrated in the left side of FIG. 10A, in the case where a pinch operation for reducing the size of the display screen is input while a character is being displayed on the display screen, the size of the character becomes larger, as illustrated in the bottom right end of FIG. 10A. Herein, the size of the character becomes larger, but since the thickness of the font effect is the same, the font effect of the character becomes weaker than the size of the character, thereby deteriorating the quality of the font effect.

Figure 10B:
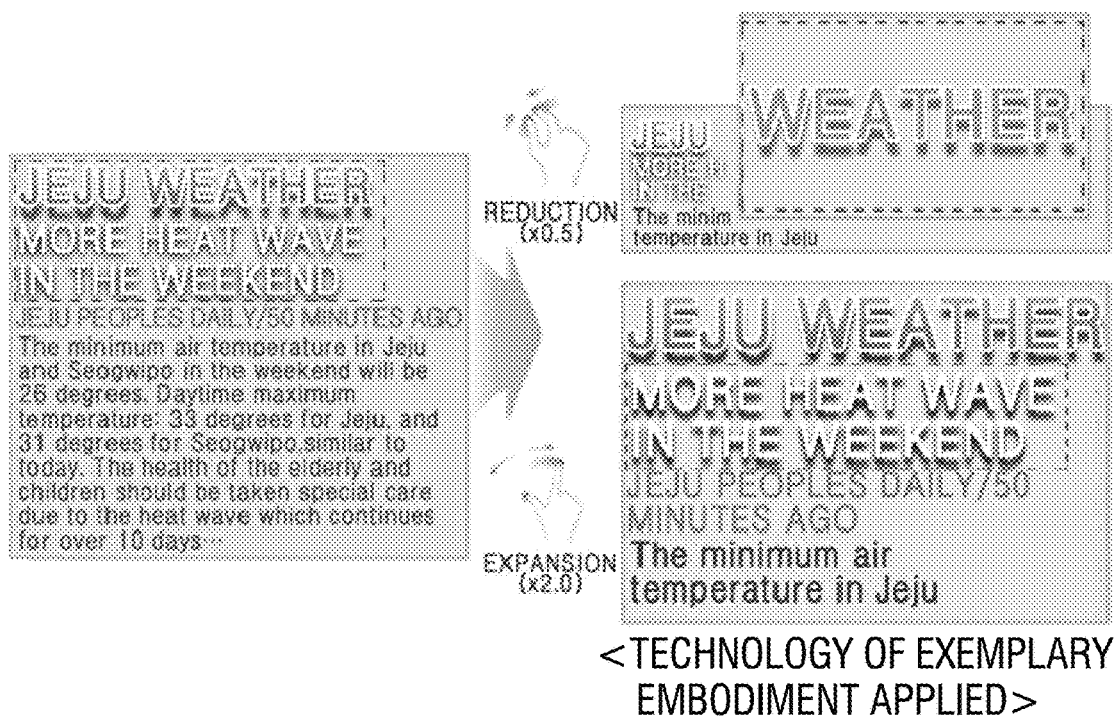

FIG. 10B is a view for explaining a case where a font effect is applied to a character when the size of the display screen is expanded or reduced by a user manipulation. As illustrated in the left side of FIG. 10B, in the case where a pinch operation is input for expanding the size of the display screen while a character is being displayed on the display screen, the size of the character becomes smaller, as illustrated in the top right end of FIG. 10B. Herein, as the size of the character becomes smaller, the font effect becomes thinner as well, thereby providing an appropriate font effect to the character and maintaining readability and visibility. In addition, as illustrated in the left side of FIG. 10B, in the case where a pinch operation is input for reducing the size of the display screen while a character is being displayed on the display screen, the size of the character becomes larger as illustrated in the bottom right end of FIG. 10B. Herein, the size of the character gets larger, but the thickness of the font effect becomes larger as well, providing an excellent font effect.

That is, in the case where the character size changes according to a user manipulation, it is possible to determine an attribute value of the font effect and apply it to the character real time, thereby providing a font effect of excellent quality regardless of the size of the character.

Figure 11:
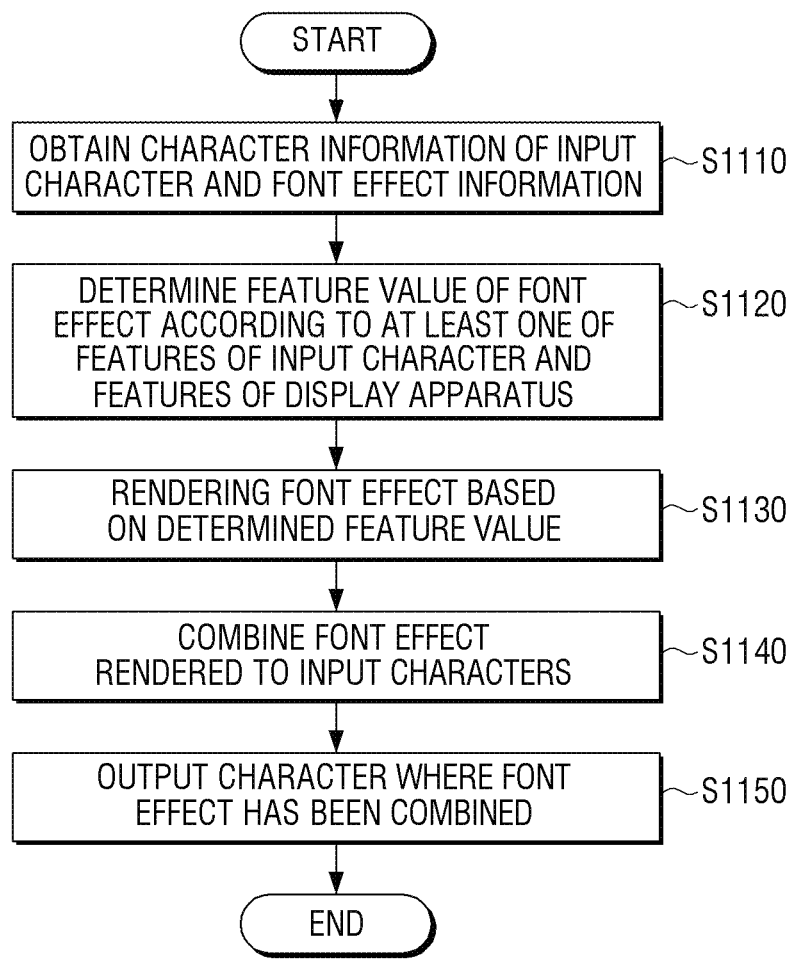
FIG. 11 is a flowchart for explaining a method for correcting a font effect according to an exemplary embodiment.

Hereinbelow is an explanation about a method for providing a font effect of the display apparatus 100 of FIG. 1 and/or a character with reference to FIG. 11.

First of all, the display apparatus 100 obtains character information of the input character and information on the font effect (S1110). Herein, the information of the input character may include information on character characteristics (for example, size, thickness, and language type of the character), and information on the font effect may include information on the type of font effect (for example, shadow effect, stroke effect, glow effect, linear gradient effect, etc.).

In addition, the display apparatus 100 determines an attribute value of the font effect according to at least one of characteristics of the input character and characteristics of the display apparatus 100 (S1120). More specifically, the display apparatus 100 may determine an attribute value of various font effects according to various characteristics such as the size, thickness, language type, etc., of the character as illustrated in FIGS. 4A to 8B. In addition, the display apparatus 100 may determine an attribute value of various font effects according to the resolution of the display apparatus 100 as explained in FIGS. 9A and 9B.

In addition, the display apparatus 100 may render the font effect based on the determined attribute value (S1130).

In addition, the display apparatus 100 applies the rendered font effect to the input character (S1140), and outputs the character to which the font effect is applied (S1150).

As in the aforementioned method for providing a font effect, by rendering the font effect considering the characteristics of the input character, it becomes possible to apply the optimal font effect to the input character and provide it to the user.

The aforementioned method is equally applicable to providing a font effect to a string of characters (e.g., a word, a phrase, etc.). That is the controller 130 may obtain typography information (e.g., typefaces, point size, line length, leading, line spacing, tracking, kerning, etc.) about the string of characters and render a font effect in considered of the string of characters as a whole not just each individual character. Thus, it becomes possible to apply an optimal font effect to the entire string of characters and provide it to the user.

Also, the aforementioned method is applicable to providing a font effect to a character (or a string of characters) that is displayed on multiple display units. For example, a user may mirror the display of their smart phone to their smart TV, computer, tablet, etc. The controller may optimize the font effect of the input characters differently for each display unit depending on the resolution of each. As a result, the characters displayed on the smart phone (e.g., first display unit) may be optimized differently from the characters displayed on the smart TV (e.g., second display unit). Thus, it becomes possible to optimize the font effect of characters displayed on one display unit differently from the font effect of the same characters displayed on a different display unit.

As in the aforementioned various exemplary embodiments of the present disclosure, a display apparatus may render a font effect considering characteristics of a character that is input, thereby applying an optimal font effect to an input character and providing it to a user. Furthermore, the display apparatus may render a font effect considering characteristics of the display apparatus, thereby correcting a consistent quality regardless of the type and resolution of the display apparatus.

The method for providing a font effect of a display apparatus 100 according to the aforementioned various exemplary embodiments may be embodied as a program and be provided to the display apparatus. The program including the method for providing a font effect of a display apparatus may be stored in a non-transitory computer readable medium and be provided.

A non-transitory computer readable medium refers to a medium that can be read by a computer and that may store data semi-permanently and not for a short period of time such as a register, cache, memory, etc. More specifically, the aforementioned various applications or programs may be stored in a non-transitory computer readable medium such as a CD, DVD, hard disk, Blu-ray disk, USB, memory card, ROM, etc., and be provided.

Although a few exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A method of providing a font effect of a display apparatus, the method comprising:
  identifying a first attribute value of a font effect to be applied to a character according to at least one of a characteristic of the character and a characteristic of the display apparatus;
  rendering the font effect based on the first attribute value and applying the rendered font effect based on the first attribute value to the character, wherein the font effect comprises a glow effect for adjusting a filtering intensity of a border of the character; and
  outputting the character to which the font effect is applied, and
  wherein the identifying the first attribute value of the font effect comprises reducing the glow effect by reducing the filtering intensity of the glow effect such that the filtering intensity of the glow effect decreases as a screen resolution characteristic of the display apparatus decreases, and
  wherein in response to a size of the character to which the rendered font effect is applied being changed, identifying a second attribute value of the font effect according to the changed character, and applying the font effect based on the second attribute value to the character.

2. The method according to claim 1, wherein the first attribute value of the font effect comprises at least one of a thickness of the font effect, a position of the font effect and a color of the font effect, and is determined at least according to the size of the character.

3. The method according to claim 2, wherein the identifying the first attribute value of the font effect comprises, in response to the font effect further comprising a stroke effect of adding a rim to the character, determining a thickness value of the stroke effect such that a thickness of the rim increases as the size of the character increases, and the thickness of the rim decreases as the size of the character decreases.

4. The method according to claim 1, wherein the first attribute value of the font effect comprises at least one of a thickness of the font effect, a position of the font effect and a color of the font effect, and is determined at least according to a thickness of the character.

5. The method according to claim 4, wherein the identifying the first attribute value of the font effect comprises, in response to the font effect including a stroke effect of adding a rim to the character, determining a thickness value of the stroke effect such that a thickness of the rim increases as a thickness of the character increases, and the thickness of the rim decreases as the thickness of the character decreases.

6. The method according to claim 1, further comprising obtaining information about the screen resolution characteristic of the display apparatus,
  wherein the identifying the first attribute value of the font effect comprises identifying the first attribute value of the font effect based on the screen resolution characteristic of the display apparatus.

7. The method according to claim 1, wherein the characteristic of the character comprises at least one of a language type of the character, a styling of the character, and a stroke complexity of the character.

8. The method according to claim 1, further comprising obtaining font effect information that includes a type of the font effect to be applied to the character, and
the type of the font effect comprises at least one of a shadow effect, the glow effect, a bevel effect, an emboss effect, a color overlay effect, a stroke effect, a linear gradient effect, and a pattern effect.

9. The method according to claim 1, further comprising turning on or off a function of adjusting the first attribute value of the font effect according to the characteristic of the character in accordance with a user setting.

10. The method as claimed in claim 1, wherein the character is one of a character input from a user and a character received from outside the display apparatus.

11. The method according to claim 1, wherein the font effect further comprises at least one of a shadow effect, a bevel effect, an emboss effect, a color overlay effect, a stroke effect, a linear gradient effect, and a pattern effect.

12. A display apparatus comprising:
an inputter configured to receive a user command input;
a controller configured to:
identify a first attribute value of a font effect to be applied to a character input through the inputter according to at least one of a characteristic of the character and a characteristic of the display apparatus,
render the font effect based on the identified first attribute value, and
apply the rendered font effect based on the identified first attribute value to the character input through the inputter, wherein the font effect comprises a glow effect for adjusting a filtering intensity of a border of the character; and
an outputter configured to output the character to which the font effect is applied,
wherein the identifying the first attribute value of the font effect comprises reducing the glow effect by reducing the filtering intensity of the glow effect such that the filtering intensity of the glow effect decreases as a screen resolution characteristic of the display apparatus decreases, and
wherein in response to a size of the character to which the rendered font effect is applied being changed, the controller identifying a second attribute value of the font effect according to the changed character, and applying the font effect based on the second attribute value to the character.

13. The display apparatus according to claim 12, wherein the first attribute value of the font effect comprises at least one of a thickness of the font effect, a position of the font effect and a color of the font effect, and the controller is configured to identify the first attribute value of the font effect according to the size of the character.

14. The display apparatus according to claim 13, wherein the controller is configured to, in response to the font effect comprising a stroke effect of adding a rim to the character, determine a thickness value of the stroke effect such that a thickness of the rim increases as the size of the character increases, and the thickness of the rim decreases as the size of the character decreases.

15. The display apparatus according to claim 12, wherein the first attribute value of the font effect comprises at least one of a thickness of the font effect, a position of the font effect and a color of the font effect, and the controller is configured to determine the first attribute value of the font effect according to a thickness of the character.

16. The display apparatus according to claim 15, wherein the controller is configured to, in response to the font effect further comprising a stroke effect of adding a rim to the character, determine a thickness value of the stroke effect such that a thickness of the rim increases as a thickness of the character increases, and the thickness of the rim decreases as the thickness of the character decreases.

17. The display apparatus according to claim 12, wherein the controller is configured to obtain information about the screen resolution characteristic of the display apparatus, and determine the first attribute value of the font effect based on the screen resolution characteristic of the display apparatus.

18. The display apparatus according to claim 12, wherein the characteristic of the input character comprises at least one of a language type of the character, styling of the character, and stroke complexity of the character.

19. The display apparatus according to claim 12, wherein the inputter is configured to receive font effect information that includes a type of the font effect to be applied to the character, and
the type of the font effect comprises at least one of a shadow effect, the glow effect, a bevel effect, an emboss effect, a color overlay effect, a stroke effect, a linear gradient effect, and a pattern effect.

20. The display apparatus according to claim 12, wherein the controller is configured to turn a function of adjusting the first attribute value of the font effect on or off according to the characteristic of the character in accordance with a user setting input through the inputter.

21. A display apparatus comprising:
an inputter configured to receive character information indicating at least a characteristic of a character and font effect information indicating at least a font effect to be applied to the character;
a controller configured to identify a first attribute value of the font effect according to at least one of the characteristic of the character and a characteristic of the display apparatus, render the font effect based on the identified first attribute value, and apply the rendered font effect based on the first attribute value to the character, wherein the font effect comprises a glow effect for adjusting a filtering intensity of a border of the character; and
an outputter configured to output the character to which the font effect is applied,
wherein the controller is configured to identify the first attribute value of the font effect by reducing the glow effect by reducing the filtering intensity of the glow effect such that the filtering intensity of the glow effect decreases as a screen resolution characteristic of the display apparatus decreases, and
wherein in response to a size of the character to which the rendered font effect is applied being changed, the controller identifying a second attribute value of the font effect according to the changed character, and applying the font effect based on the second attribute value to the character.

22. A display apparatus comprising:
a controller configured to identify a first attribute value of a font effect to be applied to a character in accordance a characteristic of the character to be displayed; and
a display configured to display the character applied with the font effect based on the first attribute value, wherein the font effect comprises a glow effect for adjusting a filtering intensity to a border of the character, wherein the controller is configured to identify the first attribute value of the font effect by reducing the glow effect by reducing the filtering intensity of the glow effect such that the filtering intensity of the glow effect decreases as a screen resolution characteristic of the display decreases, and wherein in response to a size of the character with the font effect applied being changed, the controller identifying a second attribute value of the font effect according to the changed character, and applying the font effect based on the second attribute value to the character.

23. The display apparatus according to claim 22, further comprising an inputter configured to receive a pinch operation from a user to decrease the size of the character and an expansion operation to increase the size of the character, wherein the controller is configured to, in response to the inputter receiving the pinch operation, decrease at least one of a size and a thickness of the font effect, and in response to the inputter receiving the expansion operation, increase at least one of the size and the thickness of font effect.

24. The display apparatus according to claim 23, the controller is configured to, in response to the inputter receiving the pinch operation, decrease at least one of the size and the thickness of the font effect in proportion to the decrease in the size of the character, and in response to the inputter receiving the expansion operation, increase at least one of the size and the thickness of font effect in proportion to the increase in the size of the character.

* * * * *